Figure 1:
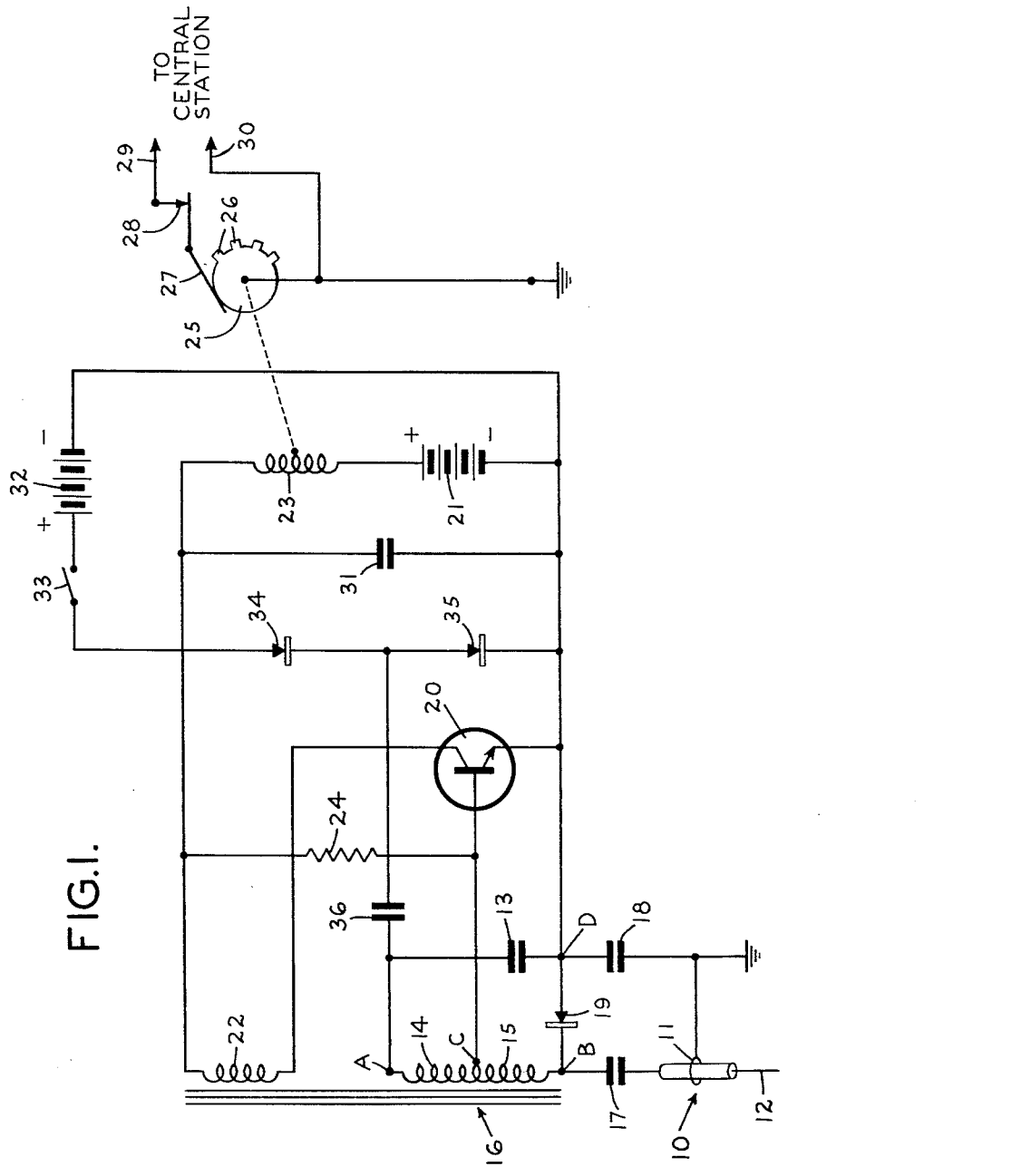

Sept. 5, 1961 P. LAAKMANN 2,999,230
LIQUID LEVEL SUPERVISORY DEVICE
Filed July 21, 1959 2 Sheets-Sheet 1

2,999,230
LIQUID LEVEL SUPERVISORY DEVICE
Peter Laakmann, Staten Island, N.Y., assignor to American District Telegraph Company, Jersey City, N.J., a corporation of New Jersey
Filed July 21, 1959, Ser. No. 828,572
8 Claims. (Cl. 340—244)

The present invention relates to the supervision of liquid level in tanks and the like, and more particularly to devices for providing an alarm signal if the liquid level in a tank or other container departs from a predetermined range.

The present invention is particularly concerned with the supervision of water level in sprinkler system water storage tanks in order to provide an alarm signal in the event that the water level in the tank falls below a safe level for sprinkler operation. While the invention will be described principally in connection with this class of service, it will be apparent that the principles of the invention are applicable to other classes of liquid level supervision.

The conventional device for supervising the water level in a sprinkler system tank has been to provide a pivoted float in communication with the water in the tank and an electrical switch arranged to operate an alarm circuit when the water level drops below a predetermined safe level. Such devices have provided excellent protection for many years, especially when associated with a central station protection system. But any protection device is subject to failure under certain conditions, and hence periodic testing or inspection is necessary, which has been to some extent difficult with many water tanks, especially during winter months. For example, in a water tank it is not unknown for a float to stick.

The present invention replaces buoyancy operated devices with a capacity-sensitive device. It is recognized that capacity-type liquid level determining devices in a variety of forms have been used heretofore, for example, in measuring the fuel level in aircraft fuel tanks. But the capacity-type liquid level determining devices of the prior art have not provided the advantages of the present invention for the general class of service intended, e.g., supervision of sprinkler system tank water level and the like.

A principal object of the invention has been provision of a novel and improved liquid level supervisory device.

More particularly, it has been an object of the invention to provide a novel and improved liquid level supervisory device operating on the capacity measuring principle.

Another object of the invention has been the provision of a device of the above type which provides a prompt and positive response to a change in liquid level outside a predetermined range.

Another object of the invention has been the provision of a device of the above type which is bistable, affording substantially a direct connection in one condition and substantially an open circuit in another condition.

A further object of the invention has been the provision of a device of the above type which fails safe.

Still another object of the invention has been the provision of a device of the above type which can easily be tested from a remote point, e.g., a convenient location in the building beneath the tank even a distant central station in a central station electrical protection system.

A feature of the invention has been the provision of means in a device of the above type which positively resists operation until a critical operating point is achieved.

Other and further objects, features and advantages of the invention will appear more fully from the following description.

The liquid level supervisory device of the invention comprises an amplifier, e.g., a transistor amplifier, a phase bridge and a feedback circuit. The phase bridge includes a reference arm and a variable arm, the variable arm having a variable capacitance element arranged to be immersed in the liquid and to have its capacity vary with the liquid level. One pair of the transistor electrodes is coupled across the neutral leg of the bridge. The feedback circuit is coupled to another pair of the transistor electrodes and is coupled to the bridge circuit in regenerative relationship for one set of capacitance ratios between the reference and variable arms and in degenerative relationship for another set of capacitance ratios. When the regenerative coupling exists, oscillations are set up. In accordance with one aspect of the invention, means are provided to increase substantially the oscillation level once the oscillations start to build up. In accordance with a further aspect of the invention, means are provided selectively to unbalance the bridge in predetermined sense by a remotely applied potential.

Figures 2, 3:
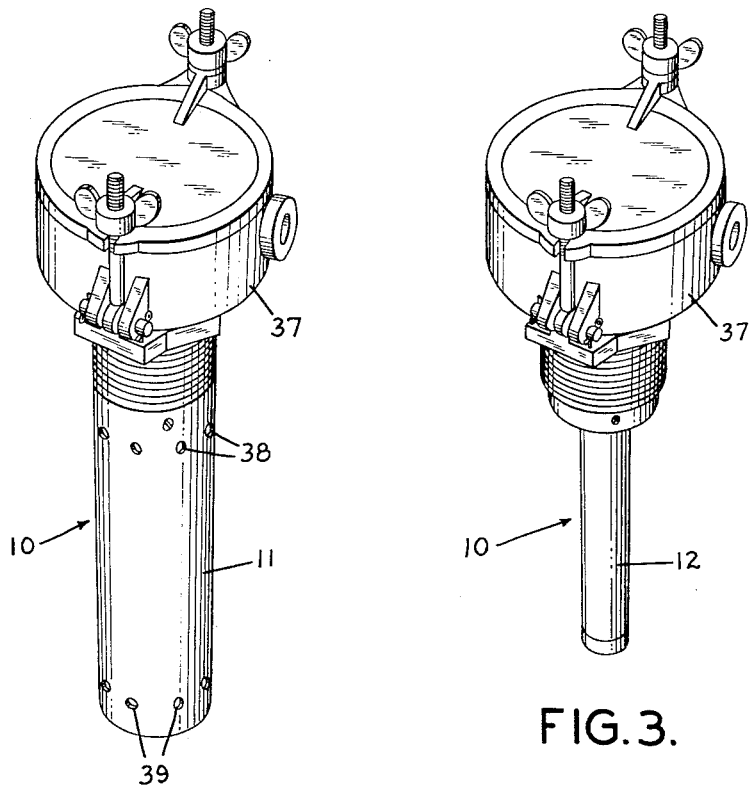

The invention will now be described in greater detail with reference to the appended drawings, in which:
FIG. 1 is a circuit diagram illustrating one form of circuit in accordance with the invention;
FIG. 2 is a perspective view illustrating one form of liquid level sensitive capacity device for use in the circuit of FIG. 1; and
FIG. 3 is a perspective view of the device of FIG. 2 with the outer capacitive electrode removed.

Referring now to the drawings, and more particularly to FIG. 1, the liquid level-sensitive element is a capacitor 10 which is intended to be immersed in the tank whose liquid level is to be supervised. The capacitor 10 has an outer electrode 11 and an inner electrode 12. The capacity afforded by the capacitor 10 will be a maximum when the liquid level in the tank is sufficiently high that the space between the electrodes 11 and 12 is completely filled with water. The capacity afforded by the capacitor 10 will be a minimum when the liquid level in the tank is sufficiently low that the space between the electrodes 11 and 12 contains no liquid and hence is filled with air. Preferably, the electrodes 11 and 12 are elongated so that a substantial range of capacity variation exists between maximum and minimum capacity values.

The capacitor 10 forms one arm of a bridge circuit. Another arm of the bridge circuit is formed by a fixed value capacitor 13. The third and fourth arms of the bridge circuit are formed by respective portions 14 and 15 of the secondary winding of a transformer 16. For convenience, the bridge terminals are designated A, B, C and D, the bridge diagonals being A—B and C—D.

Electrode 12 of capacitor 10 is coupled to terminal B through a capacitor 17 which is provided for direct current isolation and may be considered as a short circuit at the frequency of oscillation. The electrode 11 of capacitor 10 is connected to ground and, through a capacitor 18, to bridge terminal D. Capacitor 18 is provided for direct current isolation and may be considered as a short circuit at the frequency of oscillation.

Bridge terminals B and C are joined by winding portion 15, while bridge terminals C and A are joined by winding portion 14. Bridge terminals A and D are joined by capacitor 13. A diode 19 is connected between bridge terminals B and D. The diode 19 is preferably a fast switching, low leakage, high forward conductance germanium or silicon diode.

Bridge terminal C is connected to the base of a transistor 20. Bridge terminal D is connected to the emitter of the transistor 20. The collector of transistor 20 is coupled to a source of operating potential 21 (here shown as a battery) through a series connection of primary winding 22 of transformer 16 and a coil 23. The low side of source 21 is returned to the emitter of transistor 20. A forward bias is applied to transistor 20 by a resistor 24 connected between the junction of winding 22 and coil 23 and the base of transistor 20.

The transistor 20 is an amplifier which, under certain circuit conditions, acts as an oscillator in which the bridge A–B–C–D forms the tank circuit and in which feedback is afforded by the primary winding 22. When the capacitance afforded by the capacitor 10 is such that the bridge impedance ratios are equal, i.e., $$\frac{AC}{CB} = \frac{AD}{DB}$$

the bridge will be balanced and there will be no potential across the bridge diagonal CD. If terminal C forms a center tap for the secondary winding of transformer 16, the bridge will be balanced when the capacity afforded by capacitor 10 equals that of capacitor 13 (ignoring capacitors 17 and 18 whose reactance is very low at the oscillator frequency). For the moment, the diode 19 may be ignored since it is slightly reverse biased through winding 15 and resistor 24.

The bridge will be unbalanced whenever the liquid level in the tank is such as to produce a capacitance value for capacitor 10 different from that required to satisfy the bridge ratio. With the bridge unbalanced, a potential will appear across the bridge diagonal CD and therefore across the base-emitter electrodes of transistor 20. This potential will be amplified by transistor 20 and will cause a current to flow in primary winding 22, which will in turn induce a feedback voltage in the secondary winding of transformer 16. This feedback voltage will either be in phase or out of phase with the bridge output potential (across bridge diagonal CD). The circuit is arranged so that the feedback voltage will be in phase with the bridge output potential for capacity values of capacitor 10 corresponding to liquid levels equal to or greater than the minimum permissible level, but will be out of phase therewith for capacity values of capacitor 10 corresponding to liquid levels below the minimum permissible level. At some liquid level the bridge will be exactly balanced, but this is equivalent from a circuit operating standpoint to an out of phase feedback situation.

When the feedback provided by the coil 22 is in phase, a regenerative condition exists and oscillations will rapidly build up as in any ordinary oscillator circuit. But, when the feedback is out of phase, a degenerative condition exists and oscillation will not occur.

As the amplitude of the oscillations in the oscillator tank circuit builds up, a value will be reached at which diode 19 will become conductive. The diode 19 may be selected to have any desired breakdown voltage, but generally it will be selected so as to break down as soon as oscillations are set up in the tank circuit. Conduction of diode 19 will further unbalance the bridge, in a regenerative sense, tending to build up the amplitude of the oscillations even further. Conduction of diode 19 also completes a direct current circuit through winding 15 and the base-emitter junction of transistor 20. The base current of transistor 20 will therefore increase to a large value, causing an even higher collector current. The direct current flow in the transistor collector circuit will build up regeneratively until it is essentially limited only by the external circuit resistance, in this case, the resistance of transmitter coil 23.

The transistor 20 effectively acts as a switch, open (except for the small amplifier bias current through resistance 24) when the liquid level in the tank is below its minimum permissible value and closed (with saturation current flowing) when the liquid level equals or exceeds its minimum permissible value. The effective switch action is provided since the transistor oscillator circuit, with the diode 19, is bistable, being either (1) non-oscillating or (2) oscillating with saturation current flowing. The bistable nature of the oscillator circuit prevents marginal operation. To achieve this desirable situation, the diode 19 should break down at a predetermined oscillation level achieved substantially at the time oscillations first occur. The transistor oscillator may be arranged to oscillate at any desired high frequency, e.g., one megacycle. The frequency of oscillation will change slightly as the liquid level exceeds the level at which oscillations will first occur.

With saturation current flowing in the collector circuit of transistor 20, the coil 23 will be energized and will prevent rotation of a transmitter cam 25. When oscillations cease, which will occur when the liquid level falls below that at which oscillations are sustained, the transistor collector current falls to a low value and coil 23 becomes deenergized, allowing cam 25 to rotate. As cam 25 rotates, teeth 26 will engage a pivoted follower 27, in turn successively opening and closing contacts 28 to transmit a coded signal to the remote central station over conductors 29 and 30. Receipt of this signal at the central station will alert the central station personnel to the existence of a low liquid level condition in the tank being supervised so that appropriate corrective action can be initiated. With a liquid level in the tank equal to or greater than the minimum permissible value, transistor 20 will produce oscillations, coil 23 will be energized and cam 25 will be prevented from rotating. In this normal condition, a circuit will be maintained closed from conductor 29 to conductor 30 through contacts 28, follower 27 and cam 25. Since transistor 20 produces oscillations for a normal liquid level condition, the circuit will fail safe, i.e., a circuit failure (except a direct short of transistor 20) will result in the transmission of an alarm.

High frequency energy is prevented from flowing through coil 23 and source 21 by means of a shunting capacitor 31 connected across these elements.

A local signal indication of low liquid level may be provided in addition to or in lieu of the central station signalling arrangement described. For example, coil 23 could conveniently be connected in series with or replaced by a relay having contacts which will operate a visible and/or audible local alarm when the collector current of transistor 20 drops below the level which exists when oscillations are present. The "on-off" switching action of the circuit also makes it possible to energize a visible or audible signalling device, such as a lamp or a buzzer, directly from the circuit without the use of an intermediate relay.

If it should be desired to supervise against high liquid levels instead of low liquid levels, the reference capacitor 13 and the sensing capacitor 10 may be interchanged. This will change the phase relationship of the bridge circuit so that the feedback will become regenerative with a capacitance value of capacitor 10 below a predetermined value instead of above a predetermined value, as described previously. If desired, an increase in current instead of a decrease in current could be used to initiate an alarm.

In order to permit remote testing of the liquid level supervisory circuit, there is provided a source of potential 32 (shown as a battery), a switch 33, and diodes 34 and 35, all connected in series. For protection of the diodes a resistor may be included in the circuit, in which case the battery 32 may be eliminated and the switch 33 may be connected directly to the high side of battery 21. The ends of this series circuit are connected to the emitter of transistor 20. The junction of diodes 34 and 35 is coupled to bridge terminal A through a capacitor 36. When the switch 33 is closed, a forward potential appears across diodes 34 and 35, rendering these diodes conductive, whereby a direct current flows therethrough from battery 32. With diode 35 conductive, test capacitor 36 is effectively connected in parallel with reference capacitor 13, increasing the capacity of the bridge reference arm AD. An increase in the capacity of the arm AD is equivalent to a decrease in the capacity of the arm BD in so far as unbalancing the bridge is concerned. Capacitor 36 is of sufficient value that the bridge will be unbalanced sufficiently to stop oscillations in the oscillator circuit. With no oscillations, the collector current of transistor 20 will drop to a low value, coil 23 will be deenergized, and an alarm signal will be produced.

If desired, the switch 33 may be operated from the central station. For example, a relay sensitive only to a test potential on the central station connection may be arranged to close the switch 33 when the test potential is applied to the line at the central station.

With the switch 33 open, the rectifying action of the diode 35, for the high frequency oscillations, will charge the capacitor 36 until the current in this capacitor is zero, thereby functionally disconnecting the capacitor 36 from the circuit and permitting normal operation of the bridge.

Referring now to FIGS. 2 and 3, there is illustrated one example of a suitable form of construction for the capacitor 10. It should be understood, of course, that other forms of capacitors may be used. The outer electrode 11 is formed as a cylinder extending from a housing 37 which may contain the various supervisory circuit elements. However, the coil 23, battery 21, cam 25 and associated elements, the switch 33 and the battery 32 will normally be located at some convenient remote point.

The electrode 11 is provided with two series of holes, 38 and 39, located at axially spaced positions. These holes serve to admit the tank liquid to the interior of the electrode 11. The electrode 11 is normally mounted horizontally in the tank.

In FIG. 3 the outer electrode 11 has been removed, revealing the inner electrode 12, which extends from the housing 37 so as to be coaxial with the electrode 11. The electrodes 11 and 12 are mounted so as to be insulated from each other. The electrode 12 may conveniently be formed from metal tubing. The tubing should have additional insulation in the form of a coating or plastic sheeting if the device is used for conductive liquids.

While the invention has been described in connection with a specific embodiment thereof and in a specific use, various modifications thereof will occur to those skilled in the art without departing from the spirit and scope of the invention as set forth in the appended claims.

What is claimed is:

1. A liquid level supervisory device, comprising a phase bridge having a reference arm including a first capacitive element and a variable arm including a second capacitive element arranged to be immersed in said liquid and having a capacitance value dependent on the level of said liquid, a transistor having an input pair of electrodes coupled across the neutral leg of said bridge, a feedback circuit coupled between an output pair of electrodes of said transistor and arranged to be coupled to said bridge circuit, said coupling between said feedback circuit and said bridge circuit being regenerative for conditions in which the ratio of the capacitance of one of said arms to the capacitance of the other of said arms exceeds a predetermined value and being degenerative for conditions in which said ratio is less than said predetermined value, said transistor being arranged to generate an oscillatory signal when said coupling between said bridge circuit and said feedback circuit is regenerative, means responsive to presence of said oscillatory signal to produce a substantial increase in the driving current of said transistor whereby said transistor is driven to saturation and the output current of said transistor is only limited by the external load thereof after said oscillatory signal has started, and means responsive to the absence of said saturation current in said output circuit to produce an alarm signal indication.

2. A liquid level supervisory device for producing an alarm signal indication when the liquid level in a tank falls below a predetermined level, comprising a phase bridge having first and second inductive arms and third and fourth capacitive arms, said third capacitive arm comprising a first capacitive element arranged to be immersed in the liquid in said tank and having a capacitance value dependent on the level of said liquid, said fourth capacitive arm comprising a reference capacitor, a source of operating potential, an inductive element inductively coupled to said inductive arms of said bridge, a transistor amplifier having an input circuit coupled across the neutral leg of said bridge, the output circuit of said transistor amplifier being coupled to said source of operating potential through said inductive element whereby signals amplified in said transistor are introduced in feedback relationship in said bridge, said feedback being regenerative when the ratio of the capacitance of said reference capacitor to the capacitance of said first capacitive element is less than a predetermined value and being degenerative when said ratio is greater than said predetermined value, said predetermined value of said ratio corresponding substantially to said ratio when said liquid level equals said predetermined level, means to forward bias said transistor whereby said transistor will produce oscillations when said feedback is regenerative, a diode element coupled across a portion of said bridge and arranged, when conductive, to further unbalance said bridge in a sense to decrease said ratio and to provide a direct current path between the input circuit of said transistor and said inductive arms, means to reverse bias said diode element whereby said diode element will become conductive only under oscillating conditions, the unbalance of said bridge and the direct current flow through said direct current path being sufficient to produce substantially saturation current flow in the output circuit of said transistor, and means responsive to the absence of said saturation current flow to produce a low liquid level alarm signal indication.

3. A liquid level supervisory device as set forth in claim 2 in which said diode element is connected in shunt with said first capacitive element.

4. A liquid level supervisory device for producing an alarm signal indication when the liquid level in a tank falls below a predetermined level, comprising a phase bridge having first and second inductive arms and third and fourth capacitive arms, said third capacitive arm comprising a first capacitive element arranged to be immersed in the liquid in said tank and having a capacitance value dependent on the level of said liquid, said fourth capacitive arm comprising a reference capacitor, a source of operating potential, an inductive element inductively coupled to said inductive arms of said bridge, a transistor amplifier having an input circuit coupled across the neutral leg of said bridge, the output circuit of said transistor amplifier being coupled to said source of operating potential through said inductive element whereby signals amplified in said transistor are introduced in feedback relationship in said bridge, said feedback being regenerative when the ratio of the capacitance of said reference capacitor to the capacitance of said first capacitive element is less than a predetermined value and being degenerative when said ratio is greater than said predetermined value, said predetermined value of said ratio corresponding substantially to said ratio when said liquid level equals said predetermined level, means to forward bias said transistor whereby said transistor will produce oscillations when said feedback is regenerative, a diode element coupled across a portion of said bridge and arranged, when conductive, to further unbalance said bridge in a sense to decrease said ratio and to provide a direct current path between the input circuit of said transistor and said inductive arms, means to reverse bias said diode element whereby said diode element will become conductive only when the amplitude level of said oscillations exceeds a predetermined amplitude, the unbalance of said bridge caused by conduction of said diode element and the current flow in said direct current path being sufficient to produce substantially saturation current flow in the output circuit of said transistor, means responsive to the absence of said saturation current flow to produce a low liquid level alarm signal indication, a second capacitive element and a second diode element connected in series with each other, said series connection of said second capacitive element and said second diode element being connected in parallel with said reference capacitor, a source of test potential, independently operable means to apply said test potential to said second diode element in a sense to cause said second diode element to become conductive thereby effectively to connect said second capacitor in parallel with said reference capacitor, the capacitance value of said second capacitive element being sufficient to increase said ratio above said predetermined value thereof.

5. A liquid level supervisory device as set forth in claim 4 in which said independently operable means is a manually controllable switch element located at a position remote from said tank.

6. A liquid level supervisory device, comprising a phase bridge having a reference arm and a variable arm, said variable arm comprising a first capacitive element arranged to be immersed in said liquid and having a capacitance value dependent on the level of said liquid, a transistor having one pair of electrodes coupled across the neutral leg of said bridge, a feedback circuit coupled between another pair of electrodes of said transistor and arranged to be coupled to said bridge circuit, said coupling between said feedback circuit and said bridge circuit being regenerative for conditions in which the ratio of the capacitance of one of said arms to the capacitance of the other of said arms exceeds a predetermined value and being degenerative when said ratio is lower than said predetermined value, said transistor being arranged to generate an oscillatory signal only when said coupling between said bridge circuit and said feedback circuit is regenerative, means responsive to the amplitude level of said oscillatory signal to produce a substantial increase in said amplitude level when said amplitude level has exceeded a predetermined small value, means operative only in the absence of said oscillatory signal to produce an alarm signal indication, a second capacitive element, and independently operable means arranged when operated to connect said second capacitive element effectively in parallel with one of said arms.

7. A liquid level supervisory device as set forth in claim 6 in which said independently operable means includes a diode element arranged when conductive to connect said second capacitive element in parallel with said one of said arms, a source of potential, and switch means arranged to apply said potential to said diode elements to render the latter conductive.

8. A liquid level supervisory device, comprising a phase bridge having a reference arm and a variable arm, said variable arm comprising a capacitive element arranged to be immersed in said liquid and having a capacitance value dependent on the level of said liquid, a transistor having one pair of electrodes coupled across the neutral leg of said bridge, a feedback circuit coupled between another pair of electrodes of said transistor and arranged to be coupled to said bridge circuit, said coupling between said feedback circuit and said bridge circuit being regenerative for conditions in which the ratio of the capacitance of said variable arm to the capacitance of said reference arm exceeds a predetermined value and being degenerative for conditions in which said ratio is less than said predetermined value, said transistor being arranged to generate an oscillatory signal when said coupling between said bridge circuit and said feedback circuit is regenerative, means responsive to the amplitude level of said oscillatory signal to produce a substantial increase in said amplitude level when said amplitude level has exceeded a predetermined small value, means responsive to the absence of said oscillatory signal to produce an alarm signal indication, a second capacitive element having one terminal thereof coupled to one end of said reference arm, a normally nonconductive diode element intercoupling the other terminal of said second capacitive element and the other end of said reference arm, a source of potential, and independently operable means to apply said potential to said diode element to render the latter conductive thereby connecting said second capacitive element in parallel with said reference arm and decreasing said ratio.

References Cited in the file of this patent

UNITED STATES PATENTS

| | | |
|---|---|---|
| 2,657,579 | Milsom | Nov. 3, 1953 |
| 2,774,959 | Edelman | Dec. 18, 1956 |
| 2,888,945 | Marlow | June 2, 1959 |